(12) United States Patent
Aholainen (10) Patent No.: US 7,933,290 B2
(45) Date of Patent: Apr. 26, 2011

(54) SYSTEM AND METHOD FOR COMPREHENSIVE SERVICE TRANSLATION

(75) Inventor: Markus Aholainen, Pirkkala (FI)

(73) Assignee: Nokia Corporation, Espoo (FI)

(*) Notice: Subject to any disclaimer, the term of this patent is extended or adjusted under 35 U.S.C. 154(b) by 1268 days.

(21) Appl. No.: 10/813,561

(22) Filed: Mar. 30, 2004

(65) Prior Publication Data

US 2005/0220139 A1 Oct. 6, 2005

(51) Int. Cl.
*H04J 3/16* (2006.01)
(52) U.S. Cl. .................................. 370/466; 709/230
(58) Field of Classification Search ............... 370/241, 370/242, 254, 401, 465, 466, 467, 469; 709/203
See application file for complete search history.

(56) References Cited

U.S. PATENT DOCUMENTS

| | | | | |
|---|---|---|---|---|
| 5,323,392 A * | 6/1994 | Ishii et al. | ................. | 370/466 |
| 6,002,853 A * | 12/1999 | de Hond | ................. | 709/219 |
| 6,128,314 A * | 10/2000 | Kusunoki | ................. | 370/466 |
| 6,130,917 A * | 10/2000 | Monroe | ................. | 375/295 |
| 6,167,449 A | 12/2000 | Arnold et al. | | |
| 6,310,889 B1 * | 10/2001 | Parsons et al. | ................. | 370/466 |
| 6,351,771 B1 * | 2/2002 | Craddock et al. | ................. | 709/227 |
| 6,426,947 B1 * | 7/2002 | Banker et al. | ................. | 370/254 |
| 6,594,700 B1 | 7/2003 | Graham et al. | | |
| 6,741,695 B1 * | 5/2004 | McConnell et al. | ............ | 379/229 |
| 6,785,542 B1 | 8/2004 | Blight et al. | | |
| 7,010,801 B1 | 3/2006 | Jerding et al. | | |
| 7,123,710 B2 * | 10/2006 | Ravishankar | ................. | 379/221.1 |
| 7,158,515 B1 * | 1/2007 | Wang et al. | ................. | 370/392 |
| 7,191,236 B2 * | 3/2007 | Simpson-Young et al. | .. | 709/228 |
| 7,212,543 B1 * | 5/2007 | Arwald et al. | ................. | 370/466 |
| 7,227,922 B2 * | 6/2007 | Klaghofer et al. | ............. | 375/377 |
| 7,283,519 B2 | 10/2007 | Girard | | |
| 7,543,056 B2 * | 6/2009 | McClure et al. | ................ | 709/224 |
| 2002/0052966 A1 * | 5/2002 | Isomura et al. | ................ | 709/230 |
| 2002/0099814 A1 | 7/2002 | Mastrianni | | |
| 2003/0048855 A1 * | 3/2003 | Klaghofer et al. | ............ | 375/259 |
| 2004/0003058 A1 * | 1/2004 | Trossen | ........................ | 709/220 |
| 2004/0120498 A1 * | 6/2004 | Sylvain | .................... | 379/221.01 |
| 2004/0136027 A1 | 7/2004 | Zehier | | |
| 2004/0208164 A1 * | 10/2004 | Keenan et al. | ................. | 370/352 |
| 2004/0267876 A1 * | 12/2004 | Kakivaya et al. | ............. | 709/200 |

(Continued)

FOREIGN PATENT DOCUMENTS

EP 1 248 431 10/2001

(Continued)

OTHER PUBLICATIONS

Goland et al., "Simple Service Discovery Protocol/1.0", Oct. 28, 1999.

(Continued)

*Primary Examiner* — Ricky Ngo
*Assistant Examiner* — Kan Yuen
(74) *Attorney, Agent, or Firm* — Hollingsworth & Funk, LLC (57) ABSTRACT

A service translation proxy provides a variety of translation services during the service discovery and subsequent service consumption phase. The service translation proxy receives a service request in accordance with one particular Service Description Protocol (SDP) and optionally translates the service request into the correct SDP as required using the appropriate service discovery interface. In addition, session description, session media, and session transport translations are implemented by the service translation proxy as required to support the service.

24 Claims, 8 Drawing Sheets

U.S. PATENT DOCUMENTS

| | | | |
|---|---|---|---|
| 2005/0078644 | A1 | 4/2005 | Tsai et al. |
| 2005/0097087 | A1 | 5/2005 | Punaganti Venkata et al. |
| 2005/0149294 | A1* | 7/2005 | Gebhart .................... 702/186 |
| 2005/0160172 | A1* | 7/2005 | Eytchison ................. 709/227 |
| 2005/0220139 | A1* | 10/2005 | Aholainen ................. 370/466 |
| 2006/0178137 | A1* | 8/2006 | Loveland .................. 455/414.1 |

FOREIGN PATENT DOCUMENTS

| | | |
|---|---|---|
| EP | 1 189 405 | 3/2002 |
| WO | WO2005/026866 | 3/2005 |

OTHER PUBLICATIONS

Ritesh Mehta, "Service Discovery in Mobile Environments", pp. 1-12, Nov. 11, 2002.

C. Bettsletter and C. Renner, "A Comparison of Service Discovery Protocols and Implementation of the Service Location Protocol", 8 pages, Sep. 1, 2000.

Allard et al., "Jini Meets UPnP: An Architecture for Jini.UPnP Interoperability", pp. 1-8, Jan. 1, 2003.

Guttman, "Service Location Protocol: Automatic Discovery of IP Network Services", IEEE Internet Computing, pp. 71-80, Jul. 1, 1999.

3GPP, "IP Multimedia Subsystem (IMS)", 3GPP TS 23.228 V5.9.0, Release 5, Jun. 2003.

Camarillo et al., "Transcoding Services Invocation in the Session Initiation Protocol", Feb. 17, 2003.

Campbell et al., "Instant Message Transport Sessions using the CPIM Message Format", Oct. 25, 2002.

* cited by examiner

SYSTEM AND METHOD FOR COMPREHENSIVE SERVICE TRANSLATION

FIELD OF THE INVENTION

This invention relates in general to service discovery/consumption, and more particularly, to translation activities used during the service discovery/consumption.

BACKGROUND OF THE INVENTION

The mobile industry has experienced a period of exceptional growth during the last several years. As the next generation of mobile network growth evolves, a multitude of services will be offered, discovered, and consumed whereby rich content as well as voice, will be transported throughout a combination of mobile and internet environments, using an integrated IP network layer.

An All-IP network enables seamless network integration of different access options, e.g., broadband, mobile Internet, fixed Internet, and existing mobile systems, into a single IP layer. As such, all communication services may be carried over a single network infrastructure, thus enabling the integration of voice, data, and multimedia services. Carriers on the All-IP networks will glean a number of important benefits as well, including cost savings, scalability, flexibility, efficient network operations, and new revenue opportunities.

The number of services that will become available as a result of this seamless network integration is expected to grow enormously. Besides the classical services, such as those offered by printers, scanners, and fax machines, other network services such as information access, music on demand, and computational infrastructure services deployed within the network will be offered.

Following this trend, it becomes increasingly important to give users the possibility of finding and making use of the services that are available in the network. Ideally, users would like to obtain access to services automatically, without requiring their system to be reconfigured. With the widespread deployment of network enabled mobile devices, such as: notebooks; Personal Data Assistants (PDAs); and enhanced cellular phones, dynamic discovery of services in a visited foreign network, for example, along with automatic system configuration and content translation, will be useful features.

Service Discovery Protocols (SDP) aim to reshape the way software and network resources are configured, deployed, and advertised. The focus is not only to provide a plug and play solution, but to provide an environment in which a device can automatically discover services, including their properties, in a dynamic fashion. Among the emerging SDPs are: Service Location Protocol (SLP), Salutation, Bluetooth, Jini, and Universal Plug and Play (UPnP). Some of the goals for most of the SDPs are to: browse for services having certain attributes; choose the service based upon its attributes; and utilize the service.

Even though each SDP essentially has the same goal, all SDPs inherently have different origins, underlying technologies, flavors, and audiences. In other words, since the developers of these SDPs see the service discovery problem at different angles, the resulting solutions are often substantially divergent from one another. Accordingly, the browsing terminal must either: converse with only those Service Discovery Engines (SDE) that employ the browsing terminal's particular SDP; or conversely, bridge across all SDPs, such that proper service queries may take place regardless of the SDP currently executed by the SDE.

Once the services have been discovered, other compatibility issues arise once the service is ready for consumption. For example, two users having differing device capability may want to set up a video session, whereby the consuming user requires, for example, H.263 video format, while the service provider only offers, for example, the Motion Pictures Experts Group MPEG-2 video format. Without a video transcoder placed between the two users, the video session will not be possible, since a common Coder/Decoder (codec) will not be identified for use between the two users.

Other compatibility issues transparent to the consumer/service provider pair also exist in relation to the transport layer used to transport messages between the service consumer/provider applications. Currently, this layer may include the HyperText Transport Protocol (HTTP), Simple Mail Transfer Protocol (SMTP), File Transfer Protocol (FTP), Blocks Extensible Exchange Protocol (BEEP), Transmission Control Protocol (TCP), as well as the Real-time Transport Protocol (RTP) used for audio and video streaming services. Thus, as the number of services, content, and transport mechanisms integrated within the All-IP network increases, a universal translation mechanism used to facilitate such integration becomes increasingly advantageous.

Accordingly, there is a need in the communications industry for a system and method that facilitates such a comprehensive translation mechanism. The comprehensive translation mechanism should have the capability to provide a uniform and integrated service discovery experience for the user, while simultaneously allowing seamless content and transport translation as well.

SUMMARY OF THE INVENTION

To overcome limitations in the prior art, and to overcome other limitations that will become apparent upon reading and understanding the present specification, the present invention discloses a system and method for providing a comprehensive translation mechanism used in support of service discovery protocol translation, media session translation, and translation of transport mechanisms used to provide such services and media sessions.

In accordance with one embodiment of the invention, a method for providing comprehensive service translation comprises determining the protocol of a service discovery request received from a client, translating the protocol of the service discovery request into a service discovery protocol used by a service registry. The translated service discovery request is used to discover a service provider of the service requested. The method further comprises detecting incompatibilities between the client and the service provider and translating the service provided to the client by the service provider in response to the detected incompatibilities.

In accordance with another embodiment of the invention, a service translation system comprises a service requestor coupled to the service translation system and adapted to submit a service request using a first protocol, a service translation proxy coupled to the service requestor and adapted to translate the first protocol of the service request into a second protocol, and a service provider coupled to the service translation system and adapted to provide the service requested, wherein the service translation proxy is further adapted to translate the service provided into a format that is compatible with the service requestor.

In accordance with another embodiment of the invention, a service translation proxy comprises means for receiving a service request from a service requestor, means for translating the service request from a first protocol to a second protocol, means for locating a service provider to provide the service requested, and means for translating the service provided into a format that is compatible with capability information associated with the service requestor.

In accordance with another embodiment of the invention, a computer-readable medium having instructions stored thereon which are executable by a service translation proxy for facilitating network service translations. The instructions performing steps comprising receiving a service request from a service requester, translating the service request from a first protocol to a second protocol, locating a service provider to provide the service requested, and translating the service provided into a format that is compatible with capability information associated with the service requestor.

In accordance with another embodiment of the invention, a home network comprises a plurality of home devices adapted to exchange media content in a first format, at least one mobile device adapted to exchange media content in a second format, and a service translation proxy coupled to the plurality of home devices and the at least one mobile device. The service translation proxy is adapted to translate the media exchanged between the plurality of home devices and the at least one mobile device in response to their respective capabilities.

In accordance with another embodiment of the invention, a method of exchanging media between a mobile device and a home device comprises establishing the mobile device and the home device as entities of a wireless home network, evaluating differences in media capabilities between the mobile device and the home device, and translating media exchanged between the mobile device and the home device in response to the media capability differences between the mobile device and the home device.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system and method that provides a comprehensive framework that may be utilized by any network entity, mobile or otherwise, to implement uniform and integrated service translation. In particular, a service translation proxy is provided, such that the vocabularies and behavior of the various SDPs communicating with the service translation proxy may be translated into uniform and user friendly presentations for both the service requestor and the service provider. Accordingly, the service translation proxy allows the integration of multiple service discovery protocols to be deployed within the network, such that the particular SDP being used, for example, by the service requestor is transparent to the particular SDP being used, for example, by the service provider. The service translation proxy additionally provides the capability to: gather multiple replies from multiple SDP requests; compile the results into a uniform format; and transmit the uniform results to a service requesting entity.

Furthermore, the service translation proxy provides a framework for media adaptation, whereby the service translation proxy determines the need for adaptation based upon capabilities of the end terminals. The capabilities may be expressed by a session description within a Session Initiation Protocol (SIP) exchange, a Simple Object Access Protocol (SOAP) message, a profile or presence server acting on behalf of the end terminals, or by any other means related to video/audio/messaging session capabilities and preferred communication status of the end terminals. Thus, there are no changes required in the end terminals to facilitate the service consumption session. Rather, translations throughout the service discovery/consumption process are performed transparently to the end terminals by the service translation proxy.

Figure 1:
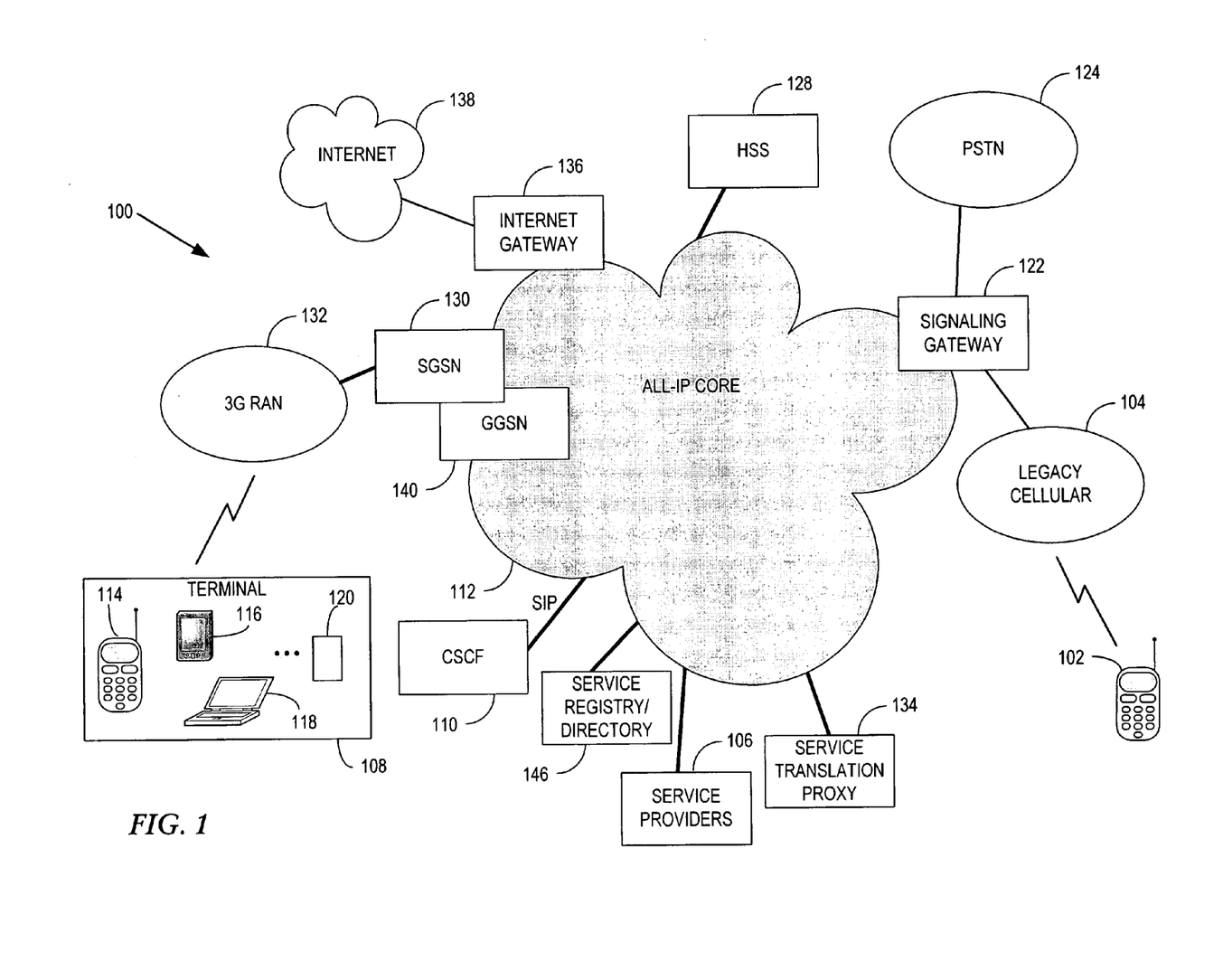
FIG. 1 illustrates and exemplary system architecture in accordance with the present invention.

An exemplary system level diagram of communication system 100, in which the principles of the present invention may be implemented, is shown in FIG. 1. All-IP core 112 provides the common, IP based signaling core utilized by communication system 100 to integrate various fixed, mobile, and Internet networks. All-IP core 112 allows all communication services to be carried over a single network infrastructure, thus enabling the integration of voice, data, and multimedia services. Further, All-IP core 112 allows network resources to be used more efficiently, where increased capacity may be deployed as necessary to meet demand.

Communication system 100 is optimized to support multimedia services, where Call Session Control Function (CSCF) 110 implementing SIP is a key ingredient in providing the multimedia services to all IP enabled devices. Although SIP's primary objective was meant for multimedia sessions, its scope may be extended to presence, gaming, Instant Messaging (IM), and service discovery/utilization, as well. Communication system 100 also supports eXtensible Markup Language (XML) based protocols for exchanging information between computers, such as SOAP. Other frameworks such as Common Object Request Broker Architecture (CORBA), Distributed Component Object Model (DCOM), and Java Remote Method Invocation (Java RMI), provide similar functionality to SOAP, and may also be supported by communication system 100 in accordance with the present invention.

The wireless terminal 108 may represent any of a number of mobile communication devices, such as cellular telephone 114, personal digital assistant (PDA) 116, notebook or laptop computer 118, or any other type of wireless terminal represented by device 120. 3rd Generation (3G) Radio Access Network (RAN) 132 represents a combination of all mobile radio standards, such as Global System for Mobile Communications (GSM)/Enhanced Data Rates for Global Evolution (EDGE) and Wideband Code Division Multiple Access (WCDMA). Each mobile radio standard has its own distinct network architectures and transport mechanisms that are fully integrated using the IP protocol, where Serving General Packet Radio Service (GPRS) Support Node (SGSN) 130 and Gateway GPRS Support Node 140 provides the RAN interface to All-IP core 112.

Communication system 100 supports Legacy Cellular systems 104 that offer communication support to legacy terminal 102, for example. Signaling gateway 122 performs all necessary Signaling System No. 7 (SS7) and Mobile Application Part (MAP) signaling conversions as necessary to provide SS7 over IP access from PSTN 124 and MAP over IP access from Legacy Cellular system 104 to All-IP core 112. In addition, signaling gateway 122 provides Short Message Service Center (SMSC) support and Multimedia Message Service Center (MMSC) support for any SMS and MMS operations as required by mobile terminal 102 and 108.

Internet 138 access from All-IP core 112 is provided through internet gateway 136 to allow access defined by Uniform Resource Locator (URL) and Uniform Resource Identifier (URI) address definitions. Home Subscriber Server (HSS) 128 provides All-IP core 112 with the many database functions that are required in All-IP networks, such as Home Location Register (HLR) and a Domain Name Server (DNS) functionalities.

Service providers 106 provide consumer applications and services that are not easily provided within the circuit switched or packet core networks by themselves. Service groups having major relevance in 3G All-IP networks include information and entertainment content providers, communication, productivity enhancing services and business solutions. Accordingly, services that are timely, personalized, simple to complete, and location specific are provided to all consumers of communication system 100.

In the service discovery/consumption domain depicted in communication system 100, mobile terminals 108 and 102 require fast and precise results that utilize simple search logic. Some of the most important aspects associated with the mobile service discovery scenario are: implementation of an efficient search infrastructure concentrating on the content relative to the user of the mobile terminal; a simple user interface having ready made search templates for keyword searches; and a context based infrastructure. The context based infrastructure should take into account: the user's profile, and preferences, which may include previous search attempts and favorite services; mobility and the user's location; the mobile terminal device capability and profile that the user is presumably using; and the time of the search. As discussed in more detail below, service translation proxy 134 facilitates these and other context based infrastructure components.

The process whereby a network entity first searches, then discovers, then consumes the required service dynamically is called service discovery/consumption. A service is a function of many attributes, such as type and value of content, time, location, consumer identification, and consumer categorization. These attributes along with the context of the searching device make the search criteria a complex issue to handle. Moreover, the mobility aspect of the requesting entity and the requested service makes service discovery even more challenging.

Generally speaking, there are three entities involved during the process of service discovery. First, a client entity, e.g., mobile terminal 108, tries to find or discover a service that it needs. The client entity may be a land based consumer, a mobile device, or specific software executing within the land/mobile devices. Second, a service entity, e.g., service providers 106, which is being discovered by the client entity, whereby the service entity is capable of fulfilling the client's service needs. Third, a registry entity, or directory, e.g. service registry/directory 146, which maintains a list of available services and their associated attributes that are provided by, for example, service providers 106.

Service discovery may span many different network components or domains in any given end to end scenario, depending on which device is searching/discovering and which content type is being discovered. In a first service discovery scenario, for example, service registry/directory 146 maintains a list of network resources which the client entity, e.g., mobile terminal 108, can discover. Basic network resources that are discoverable by the client entity may include, for example, Domain Name Servers (DNS) or Voice over IP (VoIP) gateways. Once the network resources are discovered, the services offered by the network resources, e.g., service providers 106, may include Mobile Information Device Profile (MIDP) applications hosted by a content provider, mobile commerce services hosted by a service portal, and/or customer services hosted by a department store, to name only a few.

Figure 2:
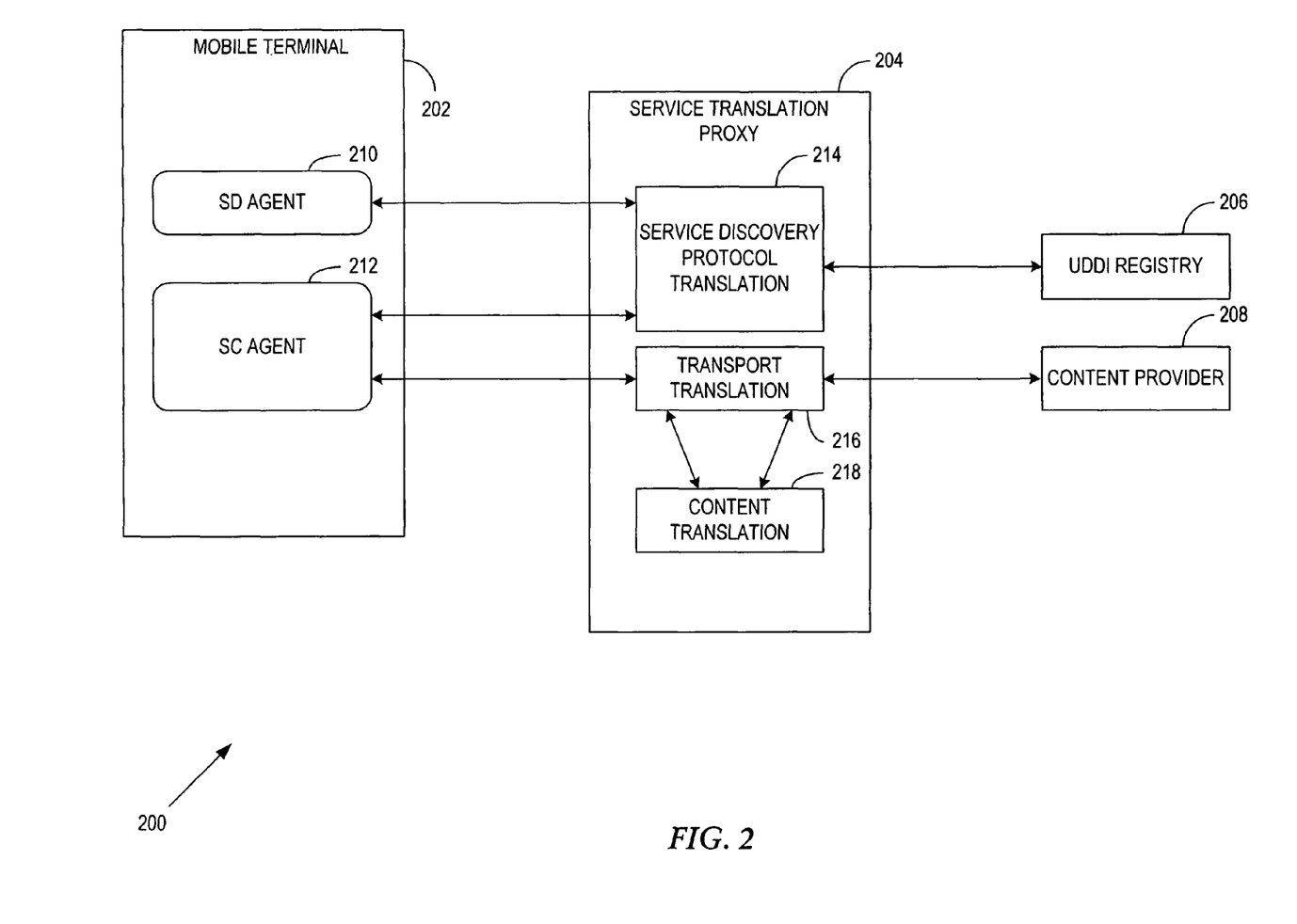
FIG. 2 illustrates an exemplary end to end architecture in accordance with the present invention.

FIG. 2 illustrates an exemplary end to end architecture 200 that may be implemented to accommodate the service discovery/consumption scenarios according to the present invention. For example, SD Agent 210 of mobile terminal 202 interacts with Service Discovery Protocol Translation (SDPT) 214 of service translation proxy 204 to discover services listed within Universal Description, Discovery, and Integration (UDDI) registry 206. In particular, SDPT 214 adapts to the particular SDP being utilized by mobile terminal 202 and performs any translation that may be necessary prior to communicating the service request to UDDI registry 206. Similarly, SDPT 214 adapts to the particular SDP being utilized in the response from UDDI registry 206 and performs any translation that may be necessary prior to communication of the response to mobile terminal 202.

Figure 3:
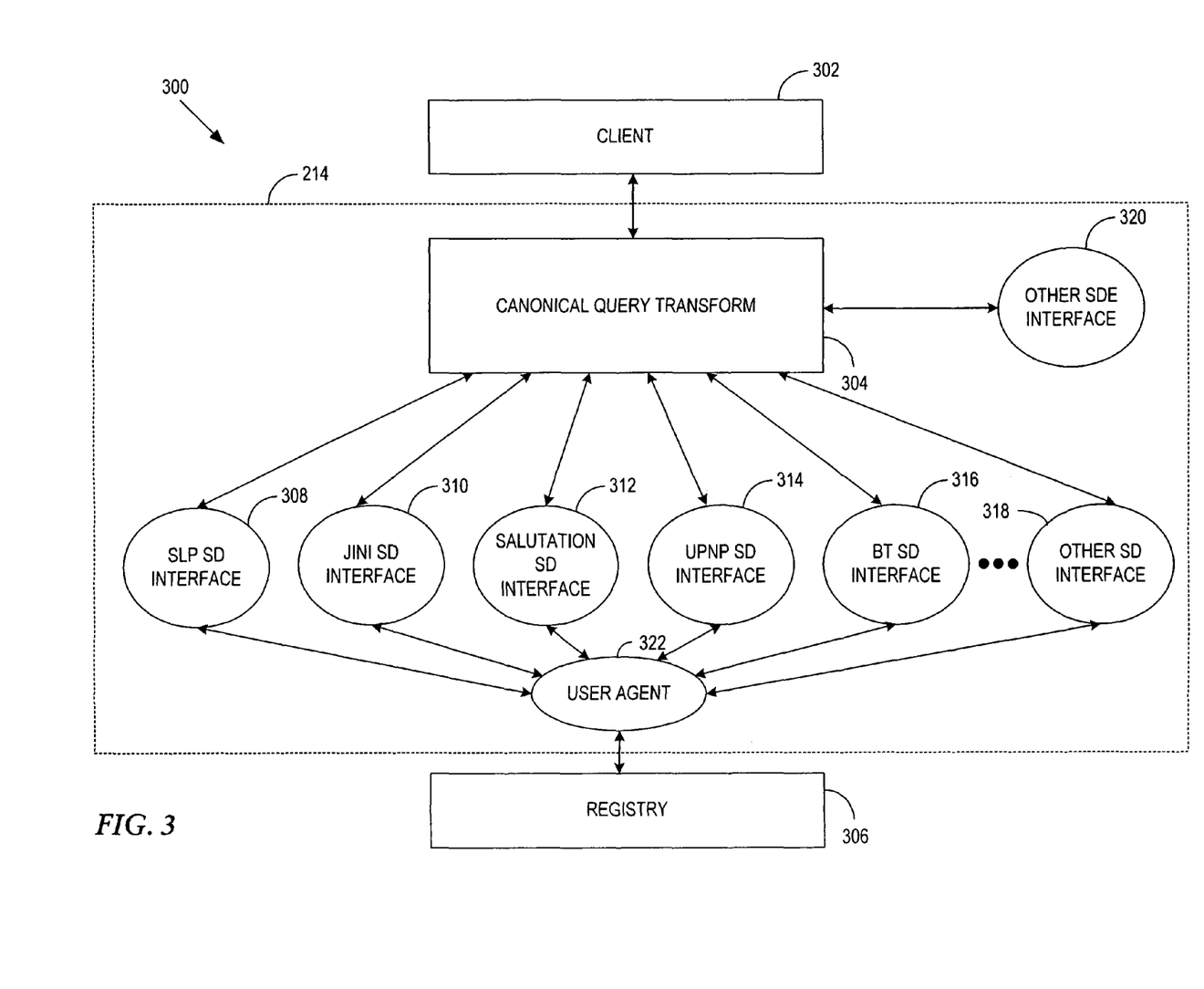
FIG. 3 illustrates an exemplary Service Discovery Protocol (SDP) translation block diagram in accordance with the present invention.

Generally speaking, SDPT 214 offers a number of SDP translation services to any requesting client 302 as illustrated in SDP translation diagram 300 of FIG. 3. Canonical Query Transform (CQT) 304 interacts with client 302 to allow generic SD queries generated by client 302 to be translated and subsequently issued via specific SD protocol interfaces 308-316 as discussed in more detail below. Other SD interfaces 318 may be added to the functionality of SDPT 214, by simply installing the correct "plug-in" as necessary to implement the required SDP translation. Accordingly, as other SDPs become available in the future, their required support functions may easily be added to SDPT 214. In addition, CQT 304 has the ability to communicate with other SDEs/SDPTs that may exist within All-IP core 112 of FIG. 1 via other SDE interface 320, such that services visible to the other SDEs/SDPTs may also be discovered by client 302.

In one embodiment according to the present invention, SDPT 214 performs Service Location Protocol (SLP) translation services. SLP is currently being developed by the Internet Engineering Task Force (IETF) as a vendor independent standard for decentralized, lightweight, and extensible service discovery. SLP uses service Uniform Resource Locators (URLs), which define the service type and address for a particular service.

In SLP operation, a Service Agent (SA) (not shown) broadcasts advertisements on behalf of a service via a service registration message (SrvMsg). The SrvMsg contains the URL for the advertised service and a set of descriptive attributes for the service. As a centralized service information repository, registry 306 caches the service registration messages from the SLP SAs and acknowledges the SrvMsg with a service acknowledgment message (SrvAck). SLP SD interface 308, on behalf of client 302, is then able to send a service request message (SrvRqst) to registry 306 via user agent 322 to request the service's location. Registry 306 may then respond with a service reply message that includes the URLs of all services matched against the request. The service reply message is then converted by CQT 304 to the particular SDP being used by client 302. Once the service reply message is converted and relayed to client 302, client 302 is then free to access/consume the services/content provided by content provider 208 via, for example, Service Consumption (SC) agent 212 of FIG. 2. Any transport protocol translation and/or content translation may be achieved via transport translation 216 and content translation 218, respectively, as discussed in more detail below.

In another embodiment according to the present invention, SDPT 214 may instead take on functionality that is consistent with Jini technology, which is an extension of the Java programming language, via Jini SD interface 310. Each Jini device (not shown) is assumed to have a Java Virtual Machine (JVM) running on it. The Jini architecture principle is similar to SLP in that devices and applications register with a Jini network using a process called Discovery and Join.

To join a Jini network, a device or application places itself into the lookup table on a lookup server, e.g., registry 306, which is a database for all services on the network. Besides pointers to services, the lookup table can also store Java based program code for these services, which enables the services to upload device drivers and other programs to enable client 302 to access the service. When client 302 wants to use the service, the object code is downloaded from the lookup table to the JVM, e.g., SC agent 212, executing within client 302. Whereas a service request in SLP returns a service URL, the Jini object code offers direct access to the service using an interface known to, for example, SC agent 212 of client 302. Thus, the code mobility offered by Jini replaces the necessity of pre-installing drivers on client 302.

In yet another embodiment according to the present invention, SDPT 214 may interact in accordance with the Salutation architecture via Salutation SD interface 312 that is being developed by an open industry consortium known as the Salutation Consortium. In Salutation, Salutation Managers (SLMs) behave as service brokers, whereby services register their capabilities with the SLM, e.g., registry 306. Client 302 may then query the SLM using a generic SDP, whereby SDPT 214 then translates the request to the Salutation protocol before submitting the request to SLM 306. Any responses to the Salutation requests are then translated by SDPT 214 as required by client 302.

According to another exemplary embodiment of the present invention, a UPnP approach may be taken, whereby SDPT 214 operates according to the Simple Service Discovery Protocol (SSDP). SSDP uses HTTP over User Datagram Protocol (UDP) and is thus designed for usage in IP networks, where peer to peer mechanisms are enabled for auto configuration of devices, service discovery, and control of services.

According to yet another exemplary embodiment of the present invention, SDPT 214 may operate in accordance with the Bluetooth SDP standard. Bluetooth is a low-power, short range, wireless radio system that operates in the 2.4 Gigahertz (GHz) Industrial, Scientific, and Medical (ISM) band to maximize international acceptance and employs a frequency hopping system to minimize interference. At the bottom of the Bluetooth stack, the radio and base band layers provide the short range, frequency hopping radio platform. The Link Manager Protocol (LMP) handles data link setup and provides authentication and encryption services. The Logical Link Control and Adaptation Protocol (L2CAP) supports multiplexed connectionless and connection oriented communication over the LMP layer. Groups of up to eight Bluetooth devices can form ad hoc networks called piconets to communicate, share services, and synchronize data. In each piconet, a master device coordinates other Bluetooth devices, which can be participating in other piconet sessions.

The Bluetooth SDP provides a simple Application Programming Interface (API) for enumerating devices, e.g., mobile terminals 202, that are in range of service translation proxy 204. Thus, mobile terminals 202 may browse for any services advertised in UDDI registry 206 via their respective Bluetooth SDP stacks. Client applications, e.g., SD agent 210 of mobile terminal 202, use the API to search for available services either by service classes, which uniquely identify types of devices, or their corresponding attributes. The Bluetooth SDP does not provide a mechanism for using discovered services, therefore, specific actions required to use the specific services offered by a Bluetooth device must be provided by a higher level protocol, e.g., as provided within SC agent 212.

As mentioned previously, service translation proxy 204 also provides a framework for content translation, whereby service translation proxy 204 determines the need for translation based upon, for example, the capabilities of the end terminals. The capabilities may be expressed by session descriptions within an SIP exchange, a SOAP message, or by any other means related to video/audio/messaging session capabilities required during the consumption of any given service. Thus, in the event that the capabilities of the service requester and the service provider are not compatible, not only must the content exchanged between the end terminals be translated by service translation proxy 204, but so must the session descriptions of the respective end terminals.

In order to discuss an exemplary aspect of the operation of service translation proxy 204, therefore, media session 400 of FIG. 4 will now be discussed in relation to the operation of transport translation and content translation modules 216 and 218 of service translation proxy 204. It should be noted, that media session 400 takes place after a service discovery session has successfully completed. In particular, for example, mobile terminal 402 has located a video streaming service offered by service provider 410 that is of interest. However, service provider 410 offers a video format that is not compatible with mobile terminal 402, which necessitates content/transport translation utilities in accordance with the present invention. Thus, while service translation proxy 204 detects the video format incompatibility between mobile terminal 402 and service provider 410, it nevertheless allows the media session to commence. This is possible because service translation proxy 204 incorporates the translation modules that are required to translate the video stream of the media session into corresponding video formats as required by mobile terminal 402 and service provider 410, respectively, while also providing the translation modules required to translate the associated session description parameters exchanged between mobile terminal 402 and service provider 410.

Media session diagram 400 illustrates an exemplary SIP session description flow that illustrates the session description/content translations that are implemented by service translation proxy 406 in accordance with the present invention. A portion of the session description for mobile terminal 402 is illustrated by the session description, e.g., SD1, contained within message 412 in which the connection data, i.e., c=<network type> <address type> <connection address>, and the media description, i.e., m=<media> <port> <transport> <fmt list>, are listed. It should be noted that the SD1 description contained within message 412 comprises only a portion of the actual session description used and is presented in its abbreviated form for illustration purposes only.

The connection data, C=IN IP4 0.0.0.1, indicates that: the Internet network type is specified, for example, by the characters, "IN"; IP version 4 is the address type specified by the characters "IP4"; and an IP address of "0.0.0.1" is listed as the connection address for user agent A, e.g., mobile terminal 402. The media description M=video 49232 RTP/AVP XX, indicates that: video media is to be used as specified by the characters "video"; a port number of "49232" is specified as the port number corresponding to user agent A; the Real-time Transport Protocol using the Audio/Video Profile (RTP/AVP) is to be utilized; and a format number specified by the characters "XX" indicating that the video format supported by mobile terminal 402 is, for example, H.263.

Serving-Call Session Control Function (S-CSCF) #1 404 checks the media capabilities described by SD1 of message 412 and since the network policy enforced by S-CSCF #1 404 allows video stream media sessions, SD1 is forwarded onto S-CSCF #2 408 via message 414. Message 416 contains the SD1 description received in message 414, but also contains the previously registered session description, e.g., SDR2, corresponding to service provider 410. S-CSCF #2 408, for example, has prior knowledge of the media capabilities of service provider 410 as obtained through the use of a registry (not shown) that advertises the services offered by service provider 410. The previously registered SDR2 information provides default information about service provider 410 such as its IP address, e.g., 0.0.0.2, its default port number, e.g., 0000, and its video capability, e.g., YY, which may correspond to an MPEG-2 video format, for example.

Service translation proxy 406 performs a session description comparison, whereby service translation proxy 406 compares session descriptions SD1 and SDR2, determines the required translations to be performed, and reserves the necessary resources to implement the required translations. In particular, SDT1 of message 418 defines in part the resources reserved by service translation proxy 406 as a result of the comparison of session descriptions SD1 and SDR2 and the determination that the video media exchanged by user agent A 402 and service provider 410 requires translation.

SDT1, for example, defines that port number 49262 at IP address 0.0.0.3 is to be used by service provider 410 when sending video media to user agent A 402 instead of port number 49232 at IP address 0.0.0.1 as originally defined by SD1. This port number and IP address change is required since all video media received by user agent A 402 must be translated by service translation proxy 406 subsequent to transmission by service provider 410. In addition, the video format originally disclosed by user agent A 402 in SD1 is changed from XX to YY so that service provider 410 assumes that video compatibility exists with user agent A 402. The modified session definition, e.g., SDT1, is then transmitted to service provider 410 in message 420.

In response, service provider 410 transmits its session description, e.g., SD2, via message 422. The SD2 description defines, for example, that service provider 410 is assigned port number 49292 at IP address 0.0.0.2, whereby video capability YY is required. Video capability YY may represent, for example, an MPEG-2 video format capability that is supported by service provider 410. S-CSCF #2 408 then transmits session description SD2 to service translation proxy 406 via message 424, in order for service translation proxy 406 to determine the need for modification of SD2 as defined in message 422.

Since video media transmitted by service provider 410 must first be translated by service translation proxy 406, SD2 is modified by service translation proxy 406 to reflect the port number, e.g., 49264, and IP address, e.g., 0.0.0.3, of service translation proxy 406 that is to be used by user agent A 402 when receiving video media. Thus, session definition SD2 is changed by service translation proxy 406 to session definition SDT2 and forwarded to S-CSCF #2 408 via message 426. SDT2 is then forwarded onto user agent A 402 via message 428.

Figure 4:
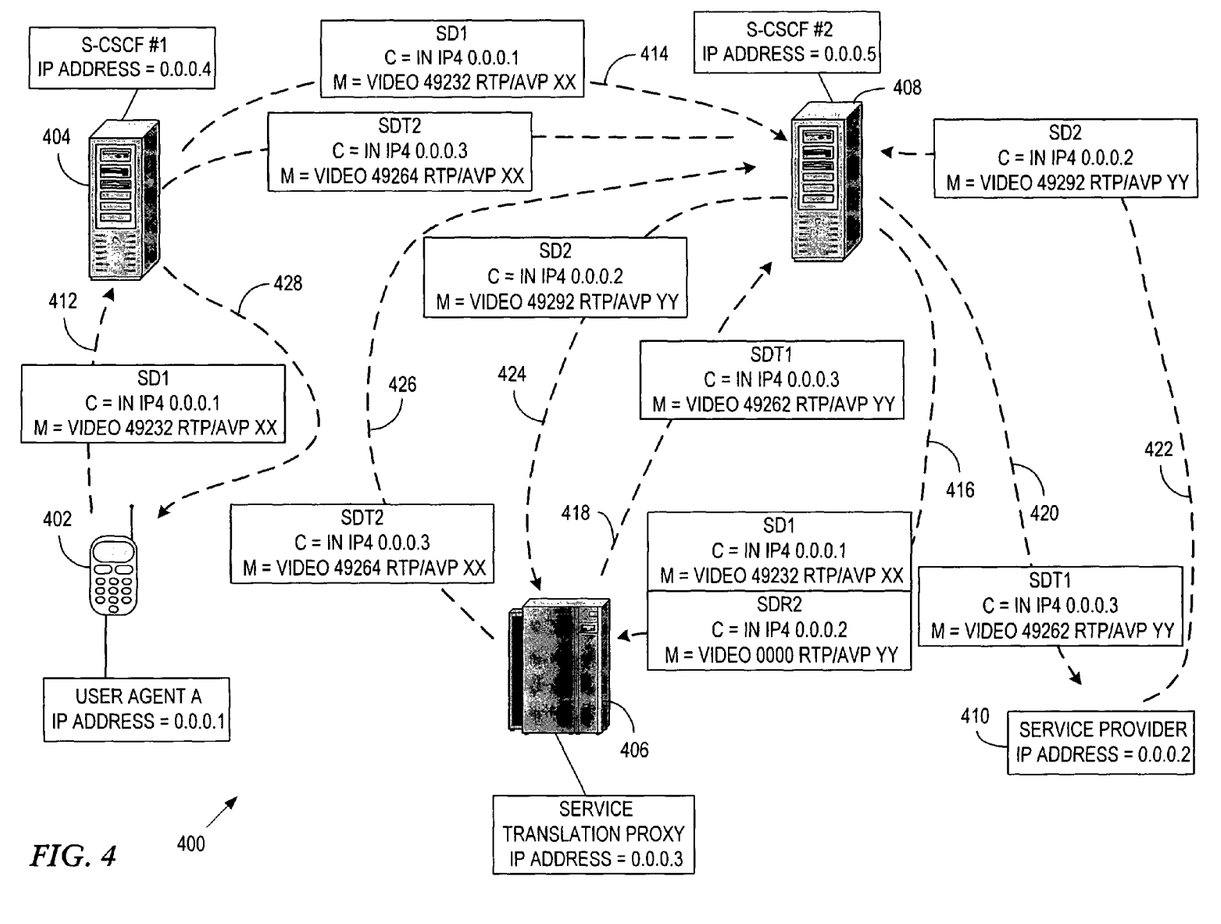
FIG. 4 illustrates an exemplary media session in accordance with the present invention.

The end result of the session definition modifications exemplified by FIG. 4 is that the media session previously requested by mobile terminal 402 during service discovery includes the translation services offered by service translation proxy 406. In particular, video media transmitted by service provider 410 to user agent A 402 must first traverse port number 49262 at IP address 0.0.0.3 of service translation proxy 406 in order for the YY->XX video translation to take place. User agent A 402 then receives the YY->XX adapted video at port 49264 from IP address 0.0.0.3 corresponding to service translation proxy 406. In addition to session definition translations, service translation proxy 406 also performs any required media translations in accordance with the present invention as discussed in more detail below.

In addition to providing SDP and media translations, service translation proxy 406 may also open transport sessions using different transport protocols to support the media session. When delivering audio and video for playback, for example, the Transmission Control Protocol (TCP) may be appropriate if sufficiently long buffering and adequate average throughput is used. Thus, referring back to FIG. 4 for example, the transport session opened between service translation proxy 406 and service provider 410 may use RTP, while the transport session opened between service translation proxy 406 and mobile terminal 402 may use TCP.

In an alternate embodiment, the present invention is useful in ad hoc networks, such as home networks, that conform for example, to the Digital Home Working Group (DHWG). The DHWG has mandated the use of media formats, such as Linear Pulse Code Modulation (LPCM) and MPEG-2, however, many categories of mobile devices are unable to support such media formats. LPCM is a format that is a popular choice in music production because it is an audio production technique that, without compressing the sound data, simultaneously samples and captures analog signals and transforms them into digital signals. The uncompressed digital audio results in the same format used for music Compact Disks (CDs), i.e., 16 bit sampling at 44.1 kilohertz (kHz).

Figure 4A:
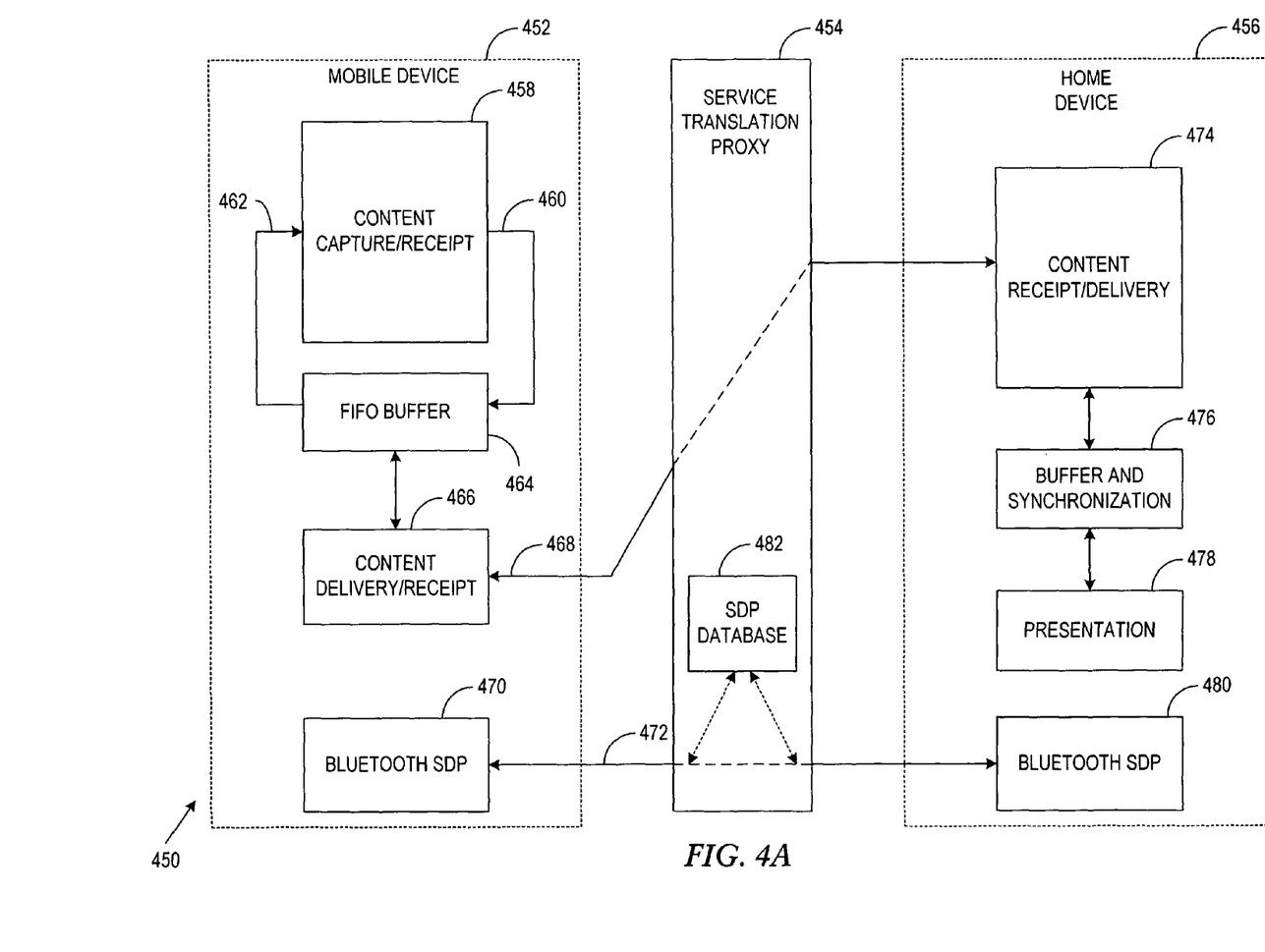
FIG. 4A illustrates an exemplary home network in accordance with the present invention.

FIG. 4A represents exemplary home network 450 that may be operating in conformance with DHWG. Mobile device 452 is arranged: to exchange data with home device 456 via path 468; and to exchange service discovery/consumption requests via path 472. The nature of the data transfer and service discovery/consumption requests may be of any type and rate that may translated by service translation proxy 454. The exemplary service discovery mechanism employed by home network 450 is supported by Bluetooth SDPs 470 and 480. Although each of mobile device 452 and home device 456 are using compatible SDPs, capability and media translation may nevertheless be required between them as discussed below.

Prior to establishing media exchange 468 between mobile device 452 and home device 456, service discovery must be performed in order to identify potential Bluetooth enabled devices/services that are represented by service translation proxy 454. SDP 470 performs this task by performing discovery of devices and services within home network 450. If home device 456 provides locally generated image data streams using MPEG-2 format, for example, then that service is made visible to mobile device 452 through service translation proxy 454, even though mobile device 452 may only support H.263 format. Service translation proxy 454 makes the MPEG-2 video services offered by home device 456 visible to mobile device 452, since service translation proxy 454 may have the capability to translate between the MPEG-2 and H.263 video formats as discussed in more detail below.

In order for the service offered by home device 456 to be advertised by service translation proxy 454, it must first be represented by a service record and kept within SDP database 482. A service record is created through SDP database 482 by managing a collection of service handles and their associated attributes that make up the service record. Within each service record exists a service class and associated profile that are used to help generalize the types of services provided by home device 456. In general, therefore, the service record contains a collection of attributes that are used by service translation proxy 454 to identify attributes and their values within the SDP database 482.

If the services offered by home device 456 are not compatible with mobile device 452, then service translation proxy 454 must first determine the capabilities of mobile device 452. Once known, service translation proxy 454 may then determine whether translation facilities are available within service translation proxy 454 to translate the media format offered by home device 456 to the media format that is compatible with mobile device 452. If translation facilities do exist, then the service record is modified by service translation proxy 454 to match the capabilities of mobile device 452.

In operation, mobile device 452 may be an image enabled device having content capture/receipt capability 458 that is capable of exchanging media with home device 456. Content capture/receipt 458 may provide both audio and video data, whereby video images may be presented in both still and video mode. In still mode, only a single image is transferred via path 460 to First-In First-Out (FIFO) buffer 464, where acknowledgement of the content receipt is generated via path 462. In video mode, multiple images arranged in back to back frame sequence are transferred to FIFO buffer 464. FIFO buffer 464 buffers the content blocks, while content delivery/receipt 466 prepares for their subsequent transfer to home device 456 via path 468 through service translation proxy 454. Service translation proxy 454 first translates the media format transmitted by mobile device 452 into media format that is compatible with home device 456 and then subsequently delivers the translated media to content receipt/delivery 474.

Buffer and synchronization block 476 is used to provide the proper frame alignment and playback speed as required by presentation 478. Presentation 478 represents any Application Programming Interface (API) that is executing on home device 456 including audio/video processing software in support of audio/video archiving, audio/video playback, etc. Additionally, audio and video media streams may be received from FIFO buffer 464 by content capture/receipt 458 for subsequent display by mobile terminal 452. In such an instance, the audio/video streams are received from content receipt/delivery 474 of home device 456 via path 468, whereby service translation proxy 454 first translates the media from the format transmitted by home device 456 into the media format that is compatible with mobile device 452 and then transmits the translated content to content delivery/receipt 466.

It should be noted that service translation proxies 204, 406, and 454 are each capable of automatic initialization in accordance with the particular network environment in which they are operating. For example, service translation proxy 204/406 may automatically: query all content providers 208 that are advertised within 206; identify which SDP, transport, and/or content translations that it is able to perform; and advertise to SD agent 210 those services that through conversion are compatible with mobile terminal 202.

Conversely, service translation proxy 454 may automatically keep track of all home devices 456 that are operating within home network 450. Home network 450 may not only include Bluetooth enabled devices, but may also include other proximity devices that are compatible with, for example, Radio Frequency Identification (RFID) technology, Wireless Local Area Network (WLAN), Infrared (IR), etc. In addition, each attribute associated with each home device is automatically stored and a translation matrix generated, such that itemization of each home device and its associated translation utility may be paired as necessary to conform to the capabilities of mobile device 452 during the service discovery and consumption phase.

Figure 5:
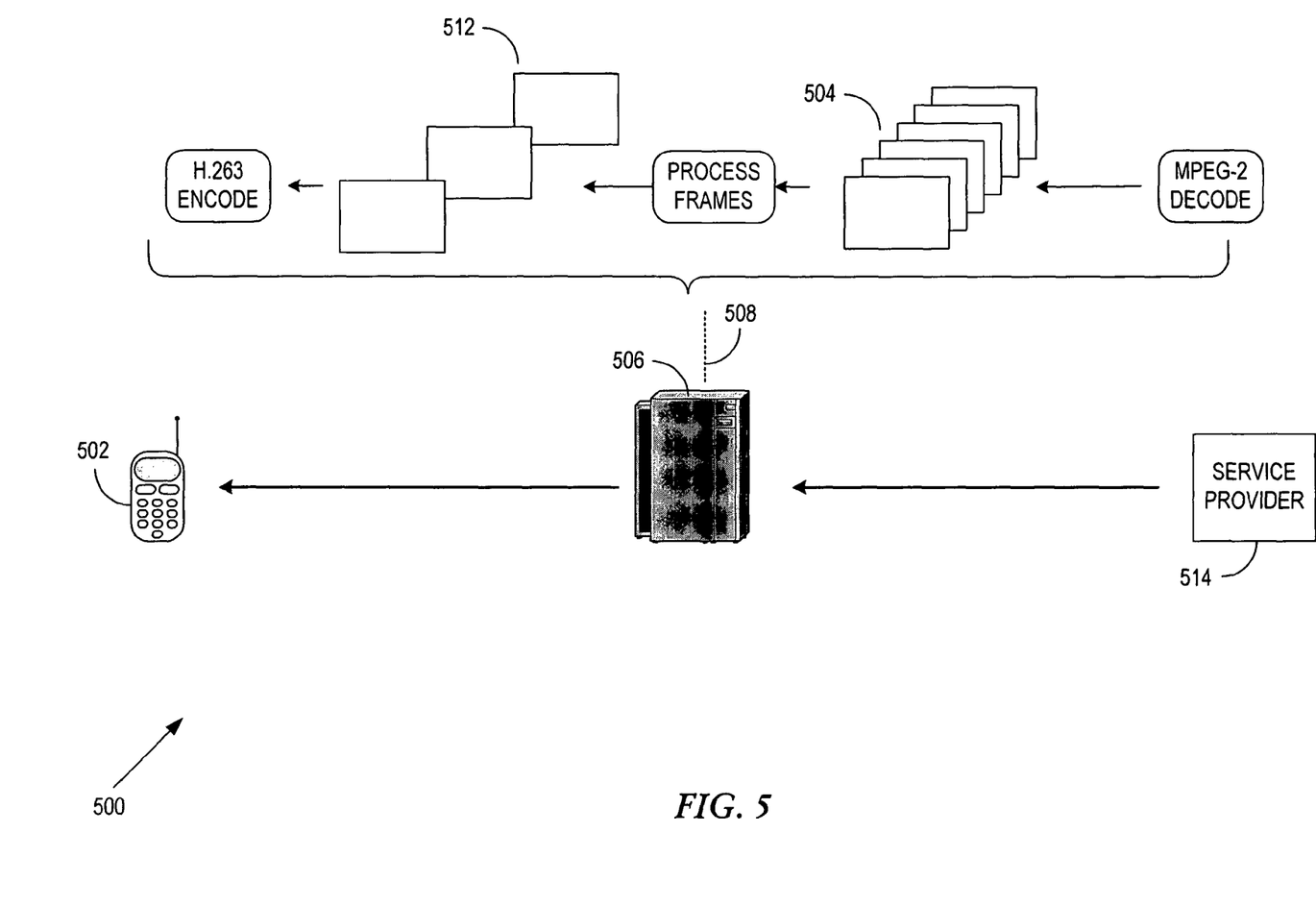
FIG. 5 illustrates an exemplary media translation process in accordance with the present invention.

FIG. 5 illustrates an exemplary translation process 500 performed by service translation proxy 506 in accordance with the present invention enabling interoperability between mobile terminal 502 and service provider 514 during a particular media session. Mobile terminal 502 and service provider 514 have different media types, codecs or attributes, which otherwise would prevent communication between the two devices. Due to the session description modifications exemplified in FIG. 4 and the media translation process as exemplified in FIG. 5, mobile terminal 502 and service provider 514 may establish a multimedia session in accordance with the present invention despite having media incompatibilities.

In particular, service provider 514 may, for example, be equipped with a high quality, low data rate video capability such as an MPEG-2 video encoder, while mobile terminal 502 may only be equipped with high bit rate video encoding capability, such as defined by the H.263 specification. Accordingly, service translation proxy 506 is required to perform full duplex, video translation of the MPEG-2/H.263 video stream, as illustrated by transcoding path 508, that is provided by service provider 514 to mobile terminal 502.

The video stream received by service translation proxy 506 is first decoded into decompressed video frames 504, processed, and then converted to form video sequence 512. The video sequences are then re-encoded into a higher or equal rate H.263 bit stream and subsequently forwarded onto mobile terminal 502 as illustrated by processing path 508. Due to processing path 508 as provided by service translation proxy 506, mobile terminal 502 and service provider 514 may conduct media sessions irrespective of their own media capabilities.

In addition, mobile terminal 502 and service provider 514 are provided the opportunity to obtain the highest quality media transfer based upon their respective media capabilities. For example, if session description 412 of FIG. 4 indicated that mobile terminal 402 was capable of the following video formats: "XX", "YY", and "ZZ", where "XX" represents the highest quality format; and session description 422 indicated that service provider 410 was capable of the following video formats: "YY" and "ZZ", then service translation proxy 406 automatically selects the common video format having the highest quality, i.e., "YY." In such an instance, service translation proxy 506 eliminates the possibility of using the lowest quality video format, i.e., "ZZ", during the media session, but instead forces the video format to the highest quality format that is in common between mobile terminal 502 and service provider 514.

Figure 6:
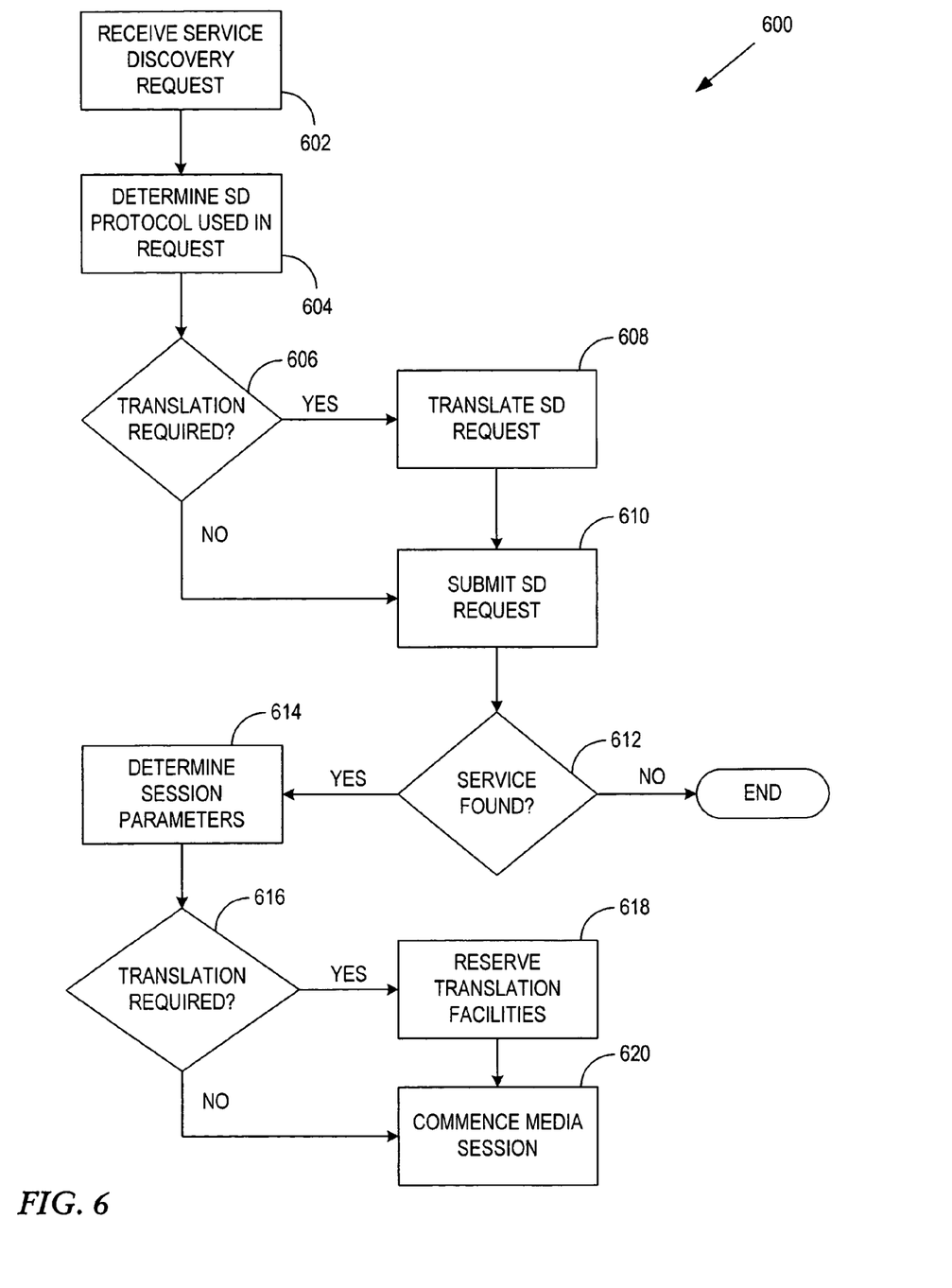
FIG. 6 illustrates an exemplary flow diagram in accordance with the present invention.

A flow diagram of exemplary service discovery/translation scenario 600 is illustrated in FIG. 6 in accordance with the principles of the present invention. In step 602, service discovery requests are received by service translation proxy 204 of FIG. 2 from SD agent 210 of a requesting client, e.g., mobile terminal 202. The SDP used by the requesting client is determined in step 604 and translated as in step 608, if translation is deemed to be required as determined in step 606. Any of SDP interfaces 308-318 may then be used in accordance with step 610 to submit the service request to the appropriate registry via user agent 322. Alternately, the service request may be submitted to another SDE/SDPT via other SDE interface 320 as required.

If a service matching the request is determined to be available as in step 612, then the required session parameters to support the service are determined in step 614. Any number of session parameters may be contemplated for a given service, where session parameters affecting the service requestor and the service provider may include: audio Coder/Decoder (codec), video codec, speech coding algorithm, display size/resolution, etc. If the session parameters required to create the session between the service provider and the service requestor are incompatible as determined in step 616, then any necessary translation facilities are reserved within service translation proxy 204 as in step 618 and the session parameters updated accordingly. Translations of the actual service content are then effected using the reserved translation modules to allow the session to commence as in step 620. Alternately, if no translation services are required, then translation modules are not reserved and the service is commenced between the parties as normal without intervention from service translation proxy 204. As discussed above, the session description parameters associated with the capabilities of the service requestor and service provider are not necessarily used. Rather, their capabilities may be exchanged via a SIP OPTIONS request, SOAP messaging, via presence subscription, etc.

It should be noted that the functions described herein that are associated with service translation proxy 204/406/506 may be implemented within a single proxy, or may alternately may be distributed throughout the network and routed as necessary to effect the same result if, for example, IP multicast is used. IP Multicast may be more efficient than a normal Internet transmission because the IP server can broadcast the session parameters to many recipients simultaneously. Unlike traditional Internet traffic that requires separate connections for each source-destination pair, IP Multicasting allows many recipients to share the same information. This means that just one set of packets is transmitted for all the destinations, such that all service translation proxies within the network may obtain the same session descriptions. Thus, the translation of service requests and replies may be effected by a first service translation proxy, while a second service translation proxy effects any media translations that may be required, since both service translation proxies have been updated with the appropriate session parameters via IP multicast.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a service translation system and method in accordance with the present invention.

Figure 7:
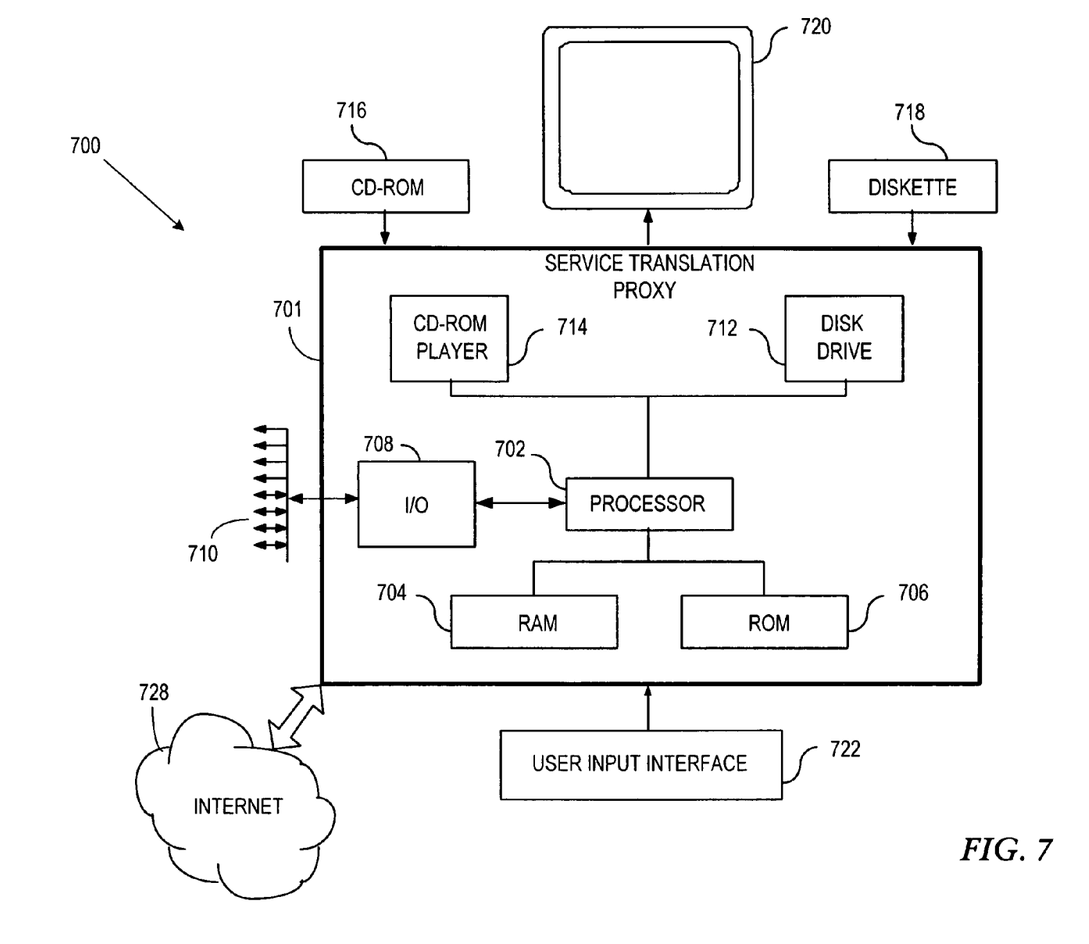
FIG. 7 is a representative computing system capable of carrying out service translation functions according to the present invention.

The service translation proxies or other systems for providing service translation functions in connection with the present invention may be any type of computing device capable of processing and communicating digital information. An example of a representative computing system capable of carrying out operations in accordance with the invention is illustrated in FIG. 7. Hardware, firmware, software or a combination thereof may be used to perform the various service translation functions and operations described herein. The computing structure 700 of FIG. 7 is an example computing structure that can be used in connection with such a service translation system.

The example computing arrangement 700 suitable for performing the service translation activity in accordance with the present invention includes service translation proxy 701, which includes a central processor (CPU) 702 coupled to random access memory (RAM) 704 and read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. External data storage devices, such as UDDI registries or directories, may be coupled to I/O circuitry 708 to facilitate service discovery functions according to the present invention. Alternatively, such databases may be locally stored in the storage/memory of the server 701, or otherwise accessible via a local network or networks having a more extensive reach such as the Internet 728. The processor 702 carries out a variety of functions as is known in the art, as dictated by software and/or firmware instructions.

Service translation proxy 701 may also include one or more data storage devices, including hard and floppy disk drives 712, CD-ROM drives 714, and other hardware capable of reading and/or storing information such as DVD, etc. In one embodiment, software for carrying out the service translation operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to service translation proxy 701 via data signals, such as being downloaded electronically via a network, such as the Internet. Service translation proxy 701 is coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The service translation proxy 701 may be coupled to other computing devices, such as the landline and/or wireless terminals via a network. The proxy may be part of a larger network configuration as in a global area network (GAN) such as the Internet 728, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
   determining a protocol of an ad hoc service discovery request received from a client via a home proximity network;
   translating the protocol of the ad hoc service discovery request into a service discovery protocol used by an Internet-located service registry by way of a generic service discovery format, the translated service discovery request being used to discover an Internet service provider of the service requested, wherein translating the protocol of the ad hoc service discovery request into a service discovery protocol used by the Internet-located service registry comprises translating the ad hoc service discovery request via a canonical query transform service operating on the home proximity network that interacts with clients to allow generic service discovery queries to be translated and subsequently issued via specific service discovery protocols;
   detecting incompatibilities between the client and the service provider based on analyzing session descriptions contained within Session Initiation Protocol (SIP) messages exchanged between the client and the service provider; and
   translating the service provided to the client by the service provider in response to the detected incompatibilities, wherein translating the service provided comprises modifying the session descriptions received from the client to match the session descriptions received from the service provider, and transmitting the modified session descriptions to the service provider.

2. The method according to claim 1, wherein translating the protocol includes selecting one of a plurality of service discovery interfaces that are compatible with the Internet-located service registry.

3. The method according to claim 1, wherein the session descriptions transmitted by the client reflect the capabilities of the client.

4. The method according to claim 3, wherein the capabilities of the client include media session capabilities.

5. The method according to claim 4, wherein the session descriptions transmitted by the service provider reflect the capabilities of the service provider.

6. The method according to claim 5, wherein the capabilities of the service provider include media session capabilities.

7. The method according to claim 6, wherein translating the service provided comprises translating media received from the service provider into a format compatible with the media session capabilities of the client.

8. The method according to claim 1, wherein translating the service provided further comprises:
   modifying the session descriptions received from the service provider to match the session descriptions received from the client; and
   transmitting the modified session descriptions to the client.

9. The method according to claim 1, wherein translating the service provided comprises:
   receiving messages from the service provider using a first transport protocol; and
   transmitting the messages received from the service provider to the client using a second transport protocol.

10. The method according to claim 9, wherein translating the service provided comprises:
    receiving messages from the client using the second transport protocol; and
    transmitting the messages received from the client to the service provider using the first transport protocol.

11. The method according to claim 1, wherein the Internet-located service registry comprises a universal description, discovery, and integration registry.

12. A system, comprising:
    a service requestor coupled to a home proximity network and configured to submit a service request using a first ad hoc service discovery protocol;
    a service translation proxy coupled to the home proximity network and configured to:
    translate the first ad hoc service discovery protocol of the service request into a second ad hoc service discovery protocol by way of a generic service discovery format, wherein at least one of the first and second ad hoc service discovery protocols utilize an Internet-located service registry, wherein translating the service request from the first ad hoc service discovery protocol to the second ad hoc service discovery protocol by way of the generic service discovery format comprises translating the service request via a canonical query transform service operating on the service translation proxy that interacts with clients to allow generic service discovery queries to be translated and subsequently issued via specific service discovery protocols;
    discover an Internet based service provider using the Internet located service registry, wherein the service provider is configured to provide the service requested;
    detect incompatibilities between the service requestor and the service provider based on analyzing session descriptions contained within Session Initiation Protocol (SIP) messages exchanged between the service requestor and the service provider; and
    translate the service provided into a format that is compatible with the service requestor, wherein translating the service provided comprises modifying the session descriptions received from the service requestor to match the session descriptions received from the service provider, and transmitting the modified session descriptions to the service provider.

13. The system according to claim 12, wherein the Internet-located service registry comprises a universal description, discovery, and integration registry.

14. An apparatus, comprising:
    means for receiving a service request from a service requestor via a home proximity network;
    means for translating the service request from a first ad hoc service discovery protocol to a second ad hoc service discovery protocol by way of a generic service discovery format, wherein at least one of the first and second ad hoc service discovery protocols utilize an Internet-located service registry, wherein translating the service request from the first ad hoc service discovery protocol to the second ad hoc service discovery protocol by way of the generic service discovery format comprises translating the service request via a canonical query transform service operating on the apparatus that interacts with clients to allow generic service discovery queries to be translated and subsequently issued via specific service discovery protocols;

means for locating a service provider to provide the service requested using the second ad hoc service discovery protocol;

means for detecting incompatibilities between the service requestor and the service provider based on analyzing session descriptions contained within Session Initiation Protocol (SIP) messages exchanged between the service requestor and the service provider; and means for translating the service provided into a format that is compatible with capability information associated with the service requestor, wherein translating the service provided comprises modifying the session descriptions received from the service requestor to match the session descriptions received from the service provider, and transmitting the modified session descriptions to the service provider.

15. The apparatus according to claim 14, further comprising:

means for receiving the service provided using a first transport protocol; and means for providing the service provided using a second transport protocol.

16. The apparatus according to claim 14, wherein the Internet-located service registry comprises a universal description, discovery, and integration registry.

17. A non-transitory computer-readable medium having instructions stored thereon which are executable by an apparatus to perform:

receiving a service request from a service requestor via a home proximity network;

translating the service request from a first service ad hoc discovery protocol to a second ad hoc service discovery protocol by way of a generic discovery service format, wherein at least one of the first and second ad hoc service discovery protocols utilize an Internet-located service registry, wherein translating the service request from the first ad hoc service discovery protocol to the second ad hoc service discovery protocol by way of the generic service discovery format comprises translating the service request via a canonical query transform service operating on the apparatus that interacts with clients to allow generic service discovery queries to be translated and subsequently issued via specific service discovery protocols;

locating a service provider to provide the service requested using the second ad hoc service discovery protocol;

detect incompatibilities between the service requestor and the service provider based on analyzing session descriptions contained within Session Initiation Protocol (SIP) messages exchanged between the service requestor and the service provider; and translating the service provided into a format that is compatible with capability information associated with the service requestor, wherein translating the service provided comprises modifying the session descriptions received from the service requestor to match the session descriptions received from the service provider, and transmitting the modified session descriptions to the service provider.

18. The computer-readable medium according to claim 17, wherein locating a service provider comprises issuing the translated service request to the Internet-located service registry.

19. The computer-readable medium according to claim 17, wherein locating a service provider comprises forwarding the service request to another service translation proxy located within the network.

20. The computer-readable medium according to claim 17, wherein the Internet-located service registry comprises a universal description, discovery, and integration registry.

21. An apparatus comprising:

a network interface capable of communicating with a service requestor via a home proximity network using a first ad hoc service discovery protocol and at least one Internet service provider via a second ad hoc service discovery protocol, wherein at least one of the first and second ad hoc service discovery protocols utilize an Internet-located service registry; a processor coupled to the network interface and configured with instructions that cause the apparatus to:

receive a service request from a service requestor;

translate the service request from a first service ad hoc discovery protocol to the second ad hoc service discovery protocol by way of a generic service discovery format, wherein translating the service request from the first ad hoc service discovery protocol to the second ad hoc service discovery protocol by way of the generic service discovery format comprises translating the service request via a canonical query transform service operating on the apparatus that interacts with clients to allow generic service discovery queries to be translated and subsequently issued via specific service discovery protocols;

locate the service provider to provide the service requested via the second ad hoc service discovery protocol;

detect incompatibilities between the service requestor and the service provider based on analyzing session descriptions contained within Session Initiation Protocol (SIP) messages exchanged between the service requestor and the service provider; and translate the service provided into a format that is compatible with capability information associated with the service requestor as determined by the first and second ad hoc service discovery protocols, wherein translating the service provided comprises modifying the session descriptions received from the service requestor to match the session descriptions received from the service provider, and transmitting the modified session descriptions to the service provider.

22. The apparatus according to claim 21, wherein locating the service provider comprises issuing the translated service request to the Internet-located service registry.

23. The apparatus according to claim 21, wherein translating the service provided comprises:

receiving messages from the service provider using a first transport protocol; and transmitting the messages received from the service provider to the service requestor using a second transport protocol.

24. The apparatus according to claim 21, wherein the Internet-located service registry comprises a universal description, discovery, and integration registry.

* * * * *

UNITED STATES PATENT AND TRADEMARK OFFICE
CERTIFICATE OF CORRECTION

PATENT NO.       : 7,933,290 B2                                                      Page 1 of 1
APPLICATION NO.  : 10/813561
DATED            : April 26, 2011
INVENTOR(S)      : Markus Aholainen It is certified that error appears in the above-identified patent and that said Letters Patent is hereby corrected as shown below:

<u>In the Claims</u>

Column 17, line 43, Claim 17: "discovery service" should read --service discovery--.

Column 18, line 24, Claim 21: "from a service" should read --from the service--.

Column 18, line 25, Claim 21: "a first service ad hoc" should read --the first ad hoc service--.

Signed and Sealed this
Ninth Day of August, 2011

David J. Kappos
*Director of the United States Patent and Trademark Office*